Figure 1:
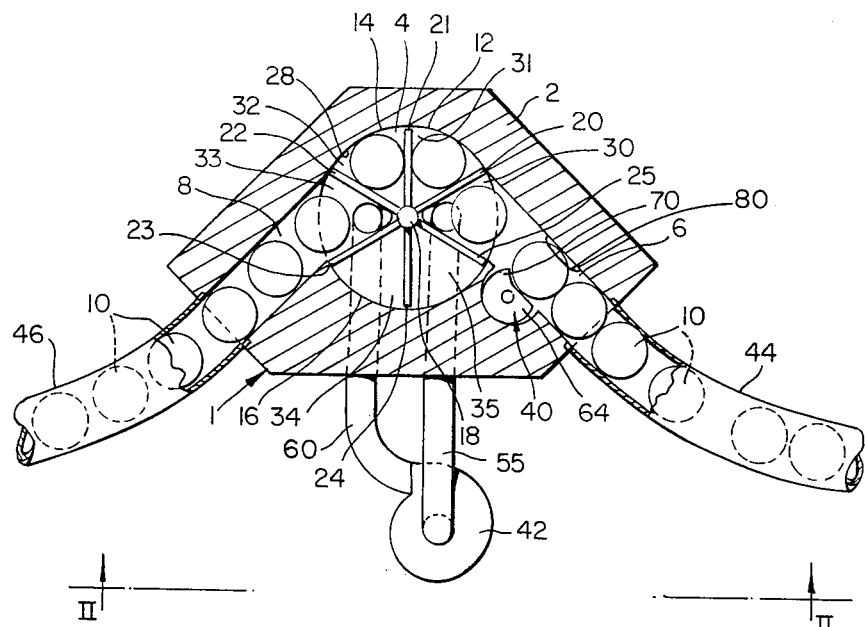

United States Patent [19]

Jensen et al.

[11] 3,907,373
[45] Sept. 23, 1975

[54] ARTICLE PASSING ROTARY SEAL

[75] Inventors: Erik J. Jensen, Edmonton; Leslie M. White, Sherwood Park, both of Canada

[73] Assignee: Research Council of Alberta, Edmonton, Canada

[22] Filed: Aug. 19, 1974

[21] Appl. No.: 498,310

[30] Foreign Application Priority Data
Nov. 22, 1973 Canada .............................. 186496

[52] U.S. Cl. ...................... 302/14; 302/23; 302/24; 302/49
[51] Int. Cl.² ......................................... B65B 53/30
[58] Field of Search ...... 302/2 R, 14, 17, 21, 23–25, 302/49, 64; 243/6; 104/155; 221/251, 263–265, 277, 278; 417/205, 206

[56] References Cited
UNITED STATES PATENTS
2,512,194  6/1950  Asaro et al. .......................... 302/14
3,522,972  8/1970  Kemp .................................... 302/49

Primary Examiner—Richard A. Schacher
Assistant Examiner—Jeffrey V. Nase
Attorney, Agent, or Firm—Francis W. Lemon

[57] ABSTRACT

An article passing rotary seal for a fluid pressurized pipeline, comprises a casing having a cylindrical cavity with a driven rotor rotatably mounted in the cylindrical cavity. The casing has a tangential inlet and tangential outlet to the cylindrical cavity and the rotor has radial arms in sliding contact with the curved surface of the cavity. Articles, e.g. spheres or cylinders of sulphur or coal are passed, by an article feed, one at a time into positions between the rotor blades and carried by them to the outlet, a pump sucks fluid, e.g. water from near the casing inlet and delivers it to near the casing outlet to assist articles entering and leaving the casing. The rotor has an equal number of radial arms sealing each side of the casing between the inlet and outlet to be pressure balanced.

8 Claims, 7 Drawing Figures

ARTICLE PASSING ROTARY SEAL

This invention relates to an article passing, rotary seal for a fluid pressurized pipeline.

It is known to employ a pipeline to transport articles, such as capsules or slugs, using a pressurized fluid as the carrier medium.

One problem that arises with pipelines for transporting articles is the introduction or removal of articles into or from the pressurized fluid in the pipeline without incurring pressure losses of undesirable magnitude in the carrier fluid in the pipeline.

It is one object of the present invention to provide an article passing, rotary seal for a fluid pressurized pipeline whereby pressure losses in the carrier fluid in the pipeline of an undesirable magnitude are avoided when articles are introduced or removed from the pressurized fluid.

These pipelines extend over long distances and so intermediate pumping stations are necessary at intermediate positions along the pipeline to compensate for pressure drops produced in the carrier fluid by conveying the articles and fluid along the pipeline. Article passing seals are required at the intermediate pumping stations so that carrier fluid can be withdrawn by a pump from the upstream side of the seal and then delivered under pressure to the downstream side of the seal. Known types of article passing seals for use at intermediate pumping stations suffer from the following disadvantages:

1. If the articles are brought to rest at the seal this causes an undue loss in momentum and thus energy, and a risk of damage to the articles, if the articles are not brought to rest, the linear line fill is limited, 2. The natural spacing of the articles travelling along the pipeline is lost at the seal and has to be regained at the cost of an additional loss of pressure in the carrier fluid.

It is further object of the present invention to provide an article passing, rotary seal for a fluid pressurized pipeline wherein the articles are not necessarily brought to rest at the seal and wherein, in some embodiments, there is less likelihood of the natural spacing of the articles being lost at the seal.

According to the present invention there is provided an article passing, rotary seal for a fluid pressurized pipeline, comprising:

a. a casing having a cylindrical cavity, and an inlet port and outlet port for conveying articles in substantially tangential directions to and from the cylindrical cavity, the inlet and outlet ports being angularly spaced around the cylindrical cavity so that the curved perimeter thereof is divided approximately equally on both sides of the inlet and outlet ports, b. a rotor rotatably mounted in the casing and having at least six arm portions radially extending from, and equally spaced around, the axis of rotation of the rotor with the arm portions in sliding contact with the casing internal surface and forming an even number of article conveying compartments each large enough to receive only one article at a time from the inlet port into the cylindrical cavity and deliver it out of the cylindrical cavity to the outlet port, c. driving means connected to the rotor for driving the rotor, d. article delivering means, connected to the casing, for successively delivering articles to the inlet port in synchronism with the article conveying compartments being adjacent to the inlet port, and e. pumping means, connected to the casing, for withdrawing fluid from each article conveying compartment when it is adjacent the inlet port, thereby drawing an article into that compartment.

Figure 4:
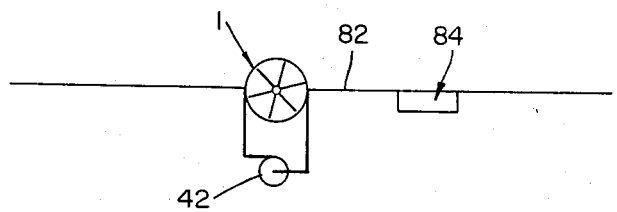
Figure 5:
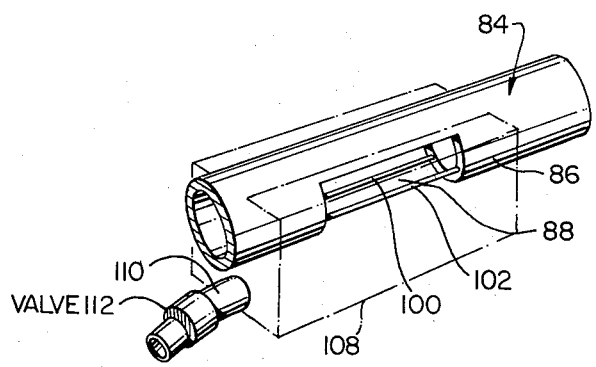
Figure 3:
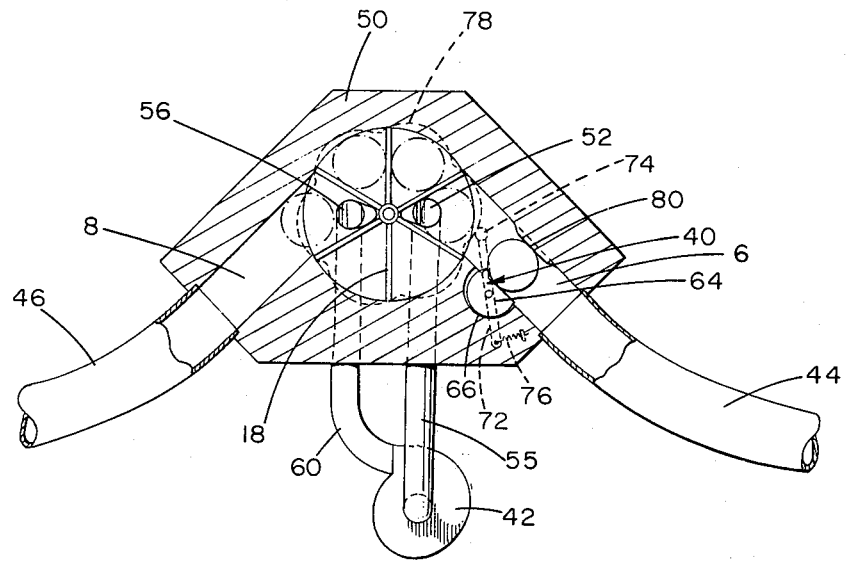
Figure 2:
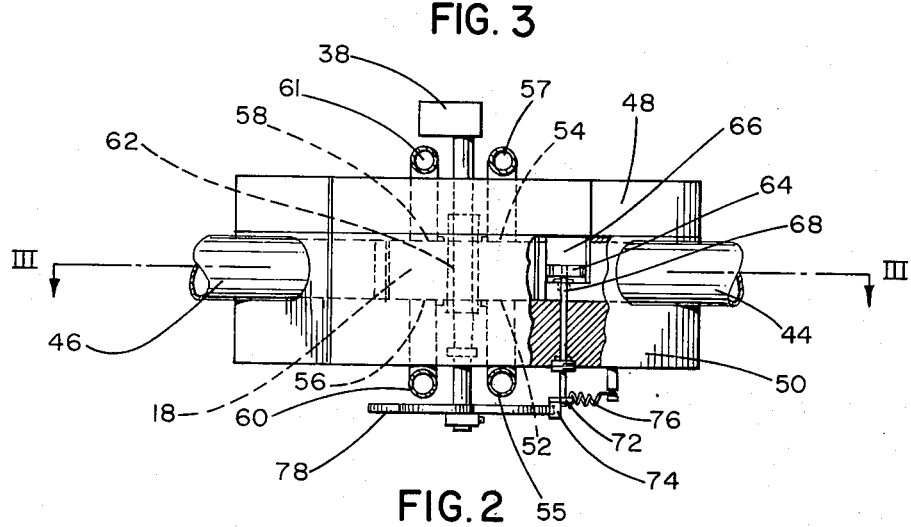
Figure 6:
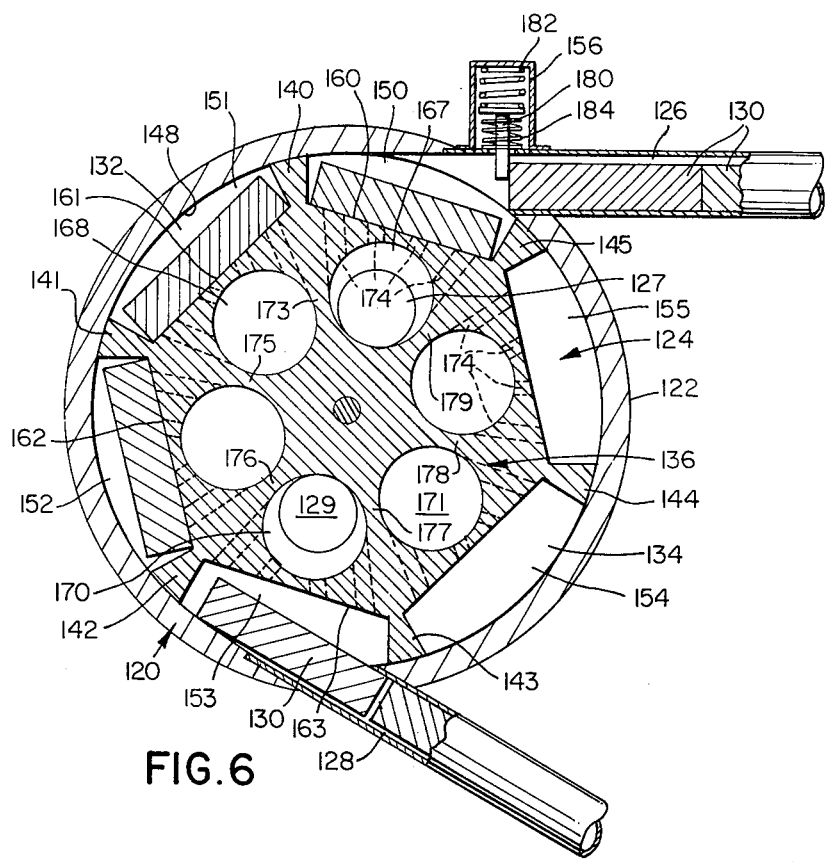
Figure 7:
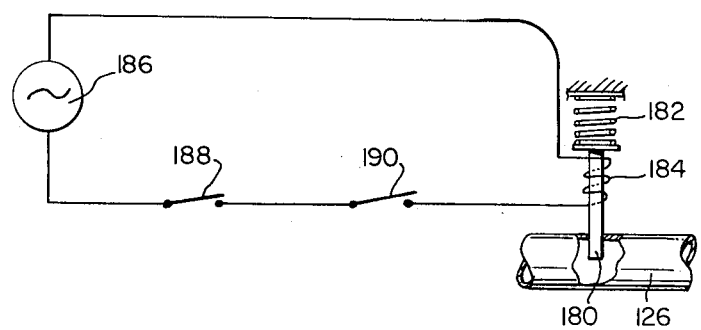

In the accompanying drawings which illustrate, by way of example, embodiments of the present invention, FIG. 1 is a sectional plan view, along the centerlines of the inlet and outlet ports, of spherical article passing, rotary seal for a pressurized pipeline, FIG. 2 is an enlarged, partly sectional side view along I—I, FIG. 1, with the pump, pipeline connections and articles not shown but details of the article delivering means included, and is below FIG. 3, FIG. 3 is a sectional plan view along III—III, FIG. 2, FIG. 4 is schematic view of a pipeline containing the article passing rotary seal shown in FIGS. 1 to 3 and a debris removal device, and is below FIG. 1, FIG. 5 is an enlarged, partly sectioned corner view of the debris removal device shown in FIG. 4, FIG. 6 is a similar view to FIG. 1, but of cylindrical article passing rotary seal, and FIG. 7 is an electrical control for the article delivery means for the rotary seal shown in FIG. 6.

Referring now to FIGS. 1 to 3 there is shown a spherical article passing rotary seal, generally designated 1, for a fluid pressurized pipeline, comprising:

a. a casing 2 having a cylindrical cavity 4, and an inlet port 6 and outlet port 8 for conveying articles 10 in substantially tangential directions to and from the cylindrical cavity 4, the inlet and outlet ports, 6 and 8 respectively, being angularly spaced around the cylindrical cavity 4 so that the curved perimeter 12 thereof is divided approximately equally on both sides 14 and 16 of the inlet and outlet ports, 6 and 8 respectively, b. a rotor 18 rotatably mounted in the casing 2 and having six arm portions 20 to 25 radially extending from, and equally spaced around, the axis of rotation of the rotor 18 with the arm portions 20 to 25 in sliding contact with the casing internal surface 28 and forming an even number (six) or article conveying compartments 30 to 35 each large enough to receive only one article 10 at a time from the inlet port 6 into the cylindrical cavity 4 and deliver it out of the cylindrical cavity 4 to the outlet port 8, c. driving means 38 (FIG. 2) connected to the rotor 18 for driving the rotor 18, d. article delivering means, generally designated 40, connected to the casing 2, for successively delivering articles 10 to the inlet port 6 in synchronism with the article conveying compartments 30 to 35 being adjacent the inlet port 6, and e. pumping means 42, connected to the casing 2, for withdrawing fluid from each article conveying compartment 30 to 35 when it is adjacent the inlet port 6, thereby drawing an article into that compartment.

The rotary seal shown in FIGS. 1 to 3 is for use as an intermediate pumping station in a pipeline (not shown), and is connected in series flow in the pipeline by pipe bends 44 and 46.

The casing 2 is in two parts 48 and 50 (FIG. 2) which are bolted together in a fluidtight manner by bolts (not shown). The casing 2 has two fluid outlet passages 52 and 54, from the cylindrical cavity 4 one on each side of the rotor 18, both connected by pipes, 55 and 57 respectively to the suction side of the pumping means 42 and positioned to withdraw fluid from each article conveying compartment 30 to 35 when each one is positioned adjacent the inlet port 6, fluid inlet passages 56 and 58 also provided in the casing 2 and lead to the cylindrical cavity 4, one on each side of the rotor 18. Both of the fluid inlet passages 56 and 58 are connected by pipes 60 and 61 respectively to the delivery side of the pumping means 42 and positioned to deliver fluid to each article conveying compartment 30 to 35 when each one is positioned adjacent the outlet port 8.

It should be noted that the passages 52, 54 56 and 58 are greater in width than the width of the arm portions 20 to 25, so that the passages 52, 54, 56 and 58 are never completely obscured by the arm portions 20 to 25, and while this is not essential, it is preferable because it allows the pumping means 42 to pump more or less continuously without introducing undue pressure surges.

It should also be noted that the passages 52, 54, 56 and 58 are at a position closer to the axis of rotation of the rotor 18 than the articles 10 can occupy in the article conveying compartments 30 to 35 and while this is not essential, it is preferable because it enhances the action of the pumping means in drawings articles 6 from the inlet port 6 into the article conveying compartments 30 to 35, and, when necessary, moving the articles 6 out of the article conveying compartments 30 to 35 into the outlet port 8.

The rotor 18 is rotatably mounted in the casing by means of a shaft 62. The rotor 18 is attached to the shaft 62 to rotate therewith, and the shaft 62 is driven by the driving means 38 which is an electric motor. The arm portions 20 to 25 are in sliding contact with the casing internal surface 28 of the casing and, when the fluid in the pipeline is a liquid, it is advantageous for a small leakage to occur between the arm portions 20 to 25 and the casing internal surface 28 because the liquid acts as a lubricant.

It is preferable for the periphery of the rotor to be travelling at a slightly greater velocity than that of the fluid moving into the inlet port 6 in order that the articles 10 are conveyed through the seal 1 at he same velocity as that at which they are delivered to the seal 1.

With the inlet and outlet ports, 6 and 8 respectively, dividing the curved perimeter 12 of the cylindrical cavity 4 into approximately equal arcs on both sides 14 and 16, and the rotor 18 having six arm portions 20 to 25 there is always the same number of article conveying compartments 30 to 35 more or less sealed on both of the sides 14 and 16, and so substantially the same fluid pressure drop exists around both sides 14 and 16 of the rotor 18. This has the advantage that the pressure differential existing between the inlet port 6 and the outlet port 8 when the seal 1 is in operation produces no noticeable torque on the rotor 18.

The article delivering means 40 comprises a latch 64, FIGS. 2 and 3 rotatably mounted in a recess 66 in the casing 2 by means of a shaft 68. The latch 64 has an article engaging lip 70 and is mounted for rotation with the shaft 68. A link 72 is attached to the shaft 68 for rotation therewith and has a cam follower 74 at one end and a tension spring 76 at the other. The cam follower 74 is urged against a cam 78 on the shaft 62. The cam 78 is mounted for rotation with the shaft 62 and guides the cam follower to tilt the latch 64 when an article conveying compartment 30 to 35 is about to be aligned with the inlet port 6. A slight time lag is necessary between when an article 10 is released by the latch 64 and when an article conveying compartment 30 to 35 is aligned with the inlet port 6 in order that an article 10 has time to travel from the latch to the rotor before an article conveying compartment 30 to 35 is aligned with the inlet port 6.

A ridge 80 is provided in the inlet port 6 and is diametrically opposite the latch 64. The ridge 80 is provided to take up the clearance between each article 10 and the inlet port 6 and hold each article against the latch 64.

In operation articles 10 which may be, for example, spheres of sulphur or particles of coal, gilsonite, iron or nickel held together by means of a binder, are transported along a pipeline by means of a fluid, for example water or oil. A number of rotary seals 1 are connected in series at intervals along a long distance pipeline to boost the fluid pressure. Articles 10 entrained in the fluid are carried along the pipeline and assume a natural spacing between one another.

The rotor 18 is rotated at a slightly greater velocity than the velocity of the fluid along the pipeline and the pump means 42 pumps fluid from passages 52 and 54 to passages 56 and 58 to boost the fluid pressure. A slight pressure loss is incurred by leakage of fluid between the arm portions 20 to 25 and the casing 2 in a direction towards the inlet port 6.

As each article 10 approaches the rotary seal 1 the latch 64, which together with the rotor 18 is synchronized with the velocity and natural spacing of the articles, passes each article 10 if the natural spacing is maintained and then each article 10 is carried round by the rotor 18, in one of the article conveying compartments 30 to 35 and passes out of the casing 2 through the outlet port 8. If for some reason the natural spacing of the articles becomes disturbed then the latch 64 will feed the articles at the correct rate and in synchronism with the rotor 18.

As stated above, the suction by the pumping means 42 of fluid from the two fluid outlet passages 52 and 54 assists in the movement of an article 10 into one of the article conveying compartments 30 to 35, and the delivery, by the pumping means 42 of fluid to the two fluid inlet ports 56 and 58 assists in moving an article 10 out of one of the article conveying compartments 30 to 35 and out of the outlet port 8.

While the rotor 18 has been described as rotating about a vertical axis it is also possible for it to rotate about a horizontal or even a sloping axis. If the rotor 18 is mounted to rotate about a horizontal or sloping axis then the gravitational effect of the articles 10 can be used to assist in turning the rotor 18. Thus, if the articles 10 have a higher specific gravity than the carrier fluid then the articles 10 are fed to the higher side of the rotor 18 and are carried thereby to a lower position, and if the articles 10 have a lower specific gravity than the carrier fluid then the articles 10 are fed to the lower side of the rotor 18 and are carried thereby to a higher position.

Advantages of the rotary seal described with reference to FIGS. 1 to 3 are:
1. a high system efficiency is obtainable because the articles 10 are not brought to rest, and are introduced into and leave the cylindrical cavity 4 tangentially and so do not encounter any abrupt changes in direction.

2. there is no practical limitation on the rate of feed or spacing at which the articles 10 are fed to the rotary seal.
3. there is no opening or closing of valves which would produce pressure surges due to momentum changes.
4. there is no starting and stopping in the flow of the carrier fluid and thus no surges due to momentum changes.
5. the rotary seal can handle articles having the same or a greater or smaller specific gravity than the carrier fluid.
6. the provision of the same number of arm portions 20 to 25 sealing both sides of the cylindrical cavity 4 makes the rotor 8 substantially pressure balanced, and so there is little or no tendency for the rotor 8 to be rotated by any fluid pressure differential on one group of arm portions, say 20 to 22, of the rotor 8 from the other group of arm portions, say 23 to 25.
7. the simplicity of the rotary seal, in comparison with known devices, facilitates trouble-free operation and a long useful life for the rotary seal.
8. frangible articles, such as those made from sulphur particles, can pass through the rotary seal with considerably less likelihood of being damaged than with known devices.

In FIG. 4 the cylindrical article passing rotary seal 1 of FIGS. 1 to 3 is shown schematically in a pipeline 82, in series with a debris removal device 84. The debris removal device is particularly useful when the articles 10, FIG. 1, are frangible, such as when the articles 10 are made from sulphur.

FIG. 5 is an enlarged, detailed view of the debris removal device 84, FIG. 4. The debris removal device 84 comprises a length 86 of the pipeline 84 having a curved section of the wall removed to provide a debris outlet opening 88 at the lower side of the pipe length 86. Two lower, parallel guide rods 100 and 102 extend across the debris outlet opening 88 to support articles 10 (FIG. 1) across the debris outlet opening 88. The pipe length 86 is sealed in an upper portion of a debris tank 108 (shown dotted) so that the debris outlet opening 88 is sealed to communicate only with the interior of the tank 108. A debris outlet 110 from the debris tank 108 has a valve 112.

In operation the pipeline 82 has carrier fluid passed therealong and entrained articles 10, and the article passing, rotary seal operates as has been previously described with reference to FIGS. 1 to 3. The articles pass over the guide rods 100 and 102. Should any of the articles 10 become damaged then any debris resulting from the damage, and entrained in the fluid, drops between the guide rods 100 and 102 and is collected in the debris tank 108. Periodically the valve 112 is opened to remove debris from the debris tank 108.

In FIG. 6 there is shown an article passing rotary seal 120, which is similar to the article passing rotary seal shown in FIGS. 1 to 3 but which is for passing cylindrical articles.

The article passing rotary seal 120 comprises a casing 122 having a cylindrical cavity 124, an inlet port 126 and an outlet port 128 for conveying articles 130 in substantially tangential directions to and from the cylindrical cavity 124. The inlet and outlet ports 126 and 128 respectively, are angularly spaced around the cylindrical cavity 124 so that the curved perimeter thereof is divided approximately equally on both sides 132 and 134 of the inlet and outlet ports 126 and 128 respectively.

A rotor 136 is rotatably mounted in the casing 2 and has six arm portions 140 to 145 radially extending from, and equally spaced around, the axis of rotation of the rotor 136 with the arm portions 140 to 145 in sliding contact with the casing internal surface 148 and forming six article conveying compartments 150 to 155 each large enough to receive only one article 130 at a time from the inlet port 126 into the cylindrical cavity 124 and deliver it out of the cylindrical cavity 124 to the outlet port 128.

The rotor 136 is connected to a driving means (not shown) which is similar to the driving means of the embodiment shown in FIGS. 1 to 3.

An article delivering means, generally designated 156, is connected to the casing 122 and is for successively delivering articles 130 from the inlet port 126 in synchronism with the article conveying compartments 150 to 155 being adjacent the inlet port 126.

A pumping means (not shown) similar to the pumping means 42, FIG. 1 is connected to the casing 122, for withdrawing fluid, via a fluid outlet passage 127, from each article conveying compartment 150 to 155 when it is adjacent the inlet port 126, thereby drawing an article 130 into that compartment, and delivering pressurized fluid via a fluid inlet passage 129 to assist in moving articles 130 to the outlet port 128.

The rotary seal 120 is for passing cylindrical articles 130 and so the rotor 136 is a regular polygon 158 in side view with the arm portions 140 to 145 extending radially from the corners of the regular polygon 158 and the axis of rotation of the rotor 136 at the center of the regular polygon 158. Adjacent each side 160 to 165 of the regular polygon 158 is a fluid passage 167 to 172 respectively extending across substantially the whole width of the rotor 136. Each fluid passage 167 to 172 has fluid conveying means in the form of bores 174 extending to the adjacent article conveying compartment 150 to 155 respectively, and aligns with the fluid inlet and outlet passages 127 to 129 to have fluid withdrawn or delivered to the adjacent article conveying compartment 150 to 155.

The fluid passages 167 to 172 are larger than the fluid inlet and outlet passages 127 and 129 so that the wall portions 174 to 179 never cover more than a negligible portion of the area of the fluid inlet and outlet passages 127 to 129.

The article delivering means 156 comprises a plunger 180 slidably located in the casing 122 and urged into the inlet port by a compression spring 182. A solenoid 184 is around the plunger 180 and is connected, as will be described later, to two switches (not shown), one of which is operated by the rotor 136, to energise the solenoid 184 and raise the plunger 180 when an article conveying compartment 150 to 155 is adjacent the inlet port 126.

In operation the article passing rotary seal 120 functions in the same manner as the article passing rotary seal described with reference to FIGS. 1 to 3. The sides 160 to 165 of the regular polygon 158 provide guiding surfaces for the articles 130 entering the article conveying compartments 150 to 155 respectively.

As in the previous embodiment described with reference to FIGS. 1 to 3, the articles 130 are each drawn into an article conveying compartment 150 to 155 by the withdrawal of fluid therefrom via the appropriate fluid passage 167 to 172 being aligned with the fluid outlet passage 127. The articles 130 are then carried round by rotor 136 and move into the outlet port 128. Pressurized fluid from the fluid inlet passage 129 assists in moving the articles 130 into the outlet port 128.

The rotation of the rotor 136 is synchronised with the natural spacing of the articles 130 passing along a pipeline (not shown) within which the rotary seal 120 is connected in series. The plunger 180 is raised to pass an article 130 into an article conveying compartment 150 to 155 only when an article conveying compartment 150 to 155 is adjacent the inlet port 126, and under normal circumstances will reciprocate between articles 130 arriving at the normal spacing. However, should the normal spacing of the articles 130 become disturbed then the plunger 180 will take over and ensure that the articles are fed to the rotor 136 in sequence with an article conveying compartment 150 to 155 being adjacent the inlet port 126.

As shown in FIG. 7 the solenoid 184, FIG. 6, is connected to a source of electrical potential 186 by two switches 188 and 190. The switch 188 is actuated to be closed by the rotor 136 (FIG. 6) when an article conveying compartment 150 to 155 is adjacent the inlet port 126. The switch 190 is actuated to be closed when an article 130 is nearly touching (or touching) the plunger 180. With both switches 188 and 190 closed the plunger 180 is withdrawn from the inlet port 126 and remains withdrawn for a sufficient period of time for one article 130 to pass under the plunger 180. When the article 130 has been drawn into an article conveying compartment 150 to 155 the switches 188 and 190 open and the plunger 180 is pushed into the inlet port 126 by the compression spring 182.

If desired the rotor may be used to assist the pumping of fluid from the inlet port to the outlet port.

It will be appreciated that if the rotary seals shown in FIGS. 1 to 6 are used to extract articles at the delivery end of a pipeline then the fluid withdrawn from the casing by the pump is not returned to the casing but is conveyed away from the articles which may be fed into a storage tank from the outlet port.

However, when the rotary seal is used to feed articles into the receiving end of a pipeline or as a pumping unit at an intermediate position along a pipeline it is necessary for the pump to deliver pressurized fluid to a fluid inlet passage in the casing.

The article delivering device may be a fluidic device using one or more fluid jets instead of a latch or a plunger.

We claim:

1. An article passing, rotary seal for a fluid pressurized pipeline, comprising:
   a. a casing having a cylindrical cavity, and an inlet port and outlet port for conveying articles in substantially tangential directions to and from the cylindrical cavity, the inlet and outlet ports being angularly spaced around the cylindrical cavity so that the curved perimeter thereof is divided approximately equally on both sides of the inlet and outlet ports,
   b. a rotor rotatably mounted in the casing and having at least six arm portions radially extending from, and equally spaced around, the axis of rotation of the rotor with the arm portions in sliding contact with the casing internal surface and forming an even number of article conveying compartments each large enough to receive only one article at a time from the inlet port into the cylindrical cavity and deliver it out of the cylindrical cavity to the outlet port,
   c. driving means connected to the rotor for driving the rotor,
   d. article delivering means, connected to the casing, for successively delivering articles to the inlet port in synchronism with the article conveying compartments being adjacent the inlet port, and
   e. pumping means, connected to the casing, for withdrawing fluid from each article conveying compartment when it is adjacent the inlet port, thereby drawing an article into that compartment.

2. A rotary seal according to claim 1, wherein the pumping means delivers fluid under pressure to each article conveying compartment when it is adjacent to the outlet port, thereby moving an article out of that compartment.

3. A rotary seal according to claim 2, wherein the pumping means has the inlet thereof connected to a fluid outlet passage in a side of the casing and between the inlet port and the axis of rotation of the rotor, and the pumping means has the outlet thereof connected to a fluid inlet passage in a side of the casing and between the outlet port and the axis of rotation of the rotor, and the fluid outlet and inlet passages are adjacent the axis of rotation of the rotor.

4. A rotary seal according to claim 3, wherein the pumping means is connected to two fluid outlet passages, one in each side of the casing, and two fluid inlet passages, one in each side of the casing.

5. A rotary seal according to claim 1, wherein the pumping means has the inlet thereof connected to a fluid outlet passage in a side of the casing and between the inlet port and the axis of rotation of the rotor and the fluid outlet passage is adjacent the axis of rotation of the rotor.

6. A rotary seal according to claim 5, wherein the pumping means is connected to two fluid outlet passages, one in each side of the casing.

7. A rotary seal according to claim 1, wherein the rotor is a regular polygon in side view, the arm portions extend radially from the corners of the regular polygon and form the article conveying compartments with the sides of the regular polygon and the casing, and the axis of rotation of the rotor is at the center of the polygon.

8. A rotary seal according to claim 7, wherein a plurality of fluid passages in the rotor extend across the whole width thereof, with one fluid passage adjacent each side of the regular polygon, and each fluid passage has fluid conveying means extending to the adjacent article conveying compartment.

* * * * *